(12) United States Patent
Hotta et al.

(10) Patent No.: US 10,211,459 B2
(45) Date of Patent: Feb. 19, 2019

(54) ELECTRODE MATERIAL, ELECTRODE, NONAQUEOUS ELECTROLYTE BATTERY INCLUDING THE SAME, AND BATTERY PACK

(71) Applicant: Kabushiki Kaisha Toshiba, Minato-ku (JP)

(72) Inventors: Yasuyuki Hotta, Ota (JP); Takashi Kuboki, Ota (JP); Shinsuke Matsuno, Minato (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 184 days.

(21) Appl. No.: 15/259,584

(22) Filed: Sep. 8, 2016

(65) Prior Publication Data

US 2017/0271673 A1 Sep. 21, 2017

(30) Foreign Application Priority Data

Mar. 17, 2016 (JP) .................. 2016-054568

(51) Int. Cl.
| | | |
|---|---|---|
| H01M 4/58 | (2010.01) | |
| H01M 10/42 | (2006.01) | |
| H01M 4/583 | (2010.01) | |
| H01M 4/36 | (2006.01) | |
| H01M 4/48 | (2010.01) | |
| H01M 4/02 | (2006.01) | |

(52) U.S. Cl.
CPC .......... *H01M 4/583* (2013.01); *H01M 4/364* (2013.01); *H01M 4/483* (2013.01); *H01M 10/425* (2013.01); *H01M 2004/027* (2013.01)

(58) Field of Classification Search
None
See application file for complete search history.

(56) References Cited

U.S. PATENT DOCUMENTS

| | | | |
|---|---|---|---|
| 5,340,670 A | 8/1994 | Takami et al. | |
| 2009/0239151 A1 | 9/2009 | Nakanishi et al. | |
| 2010/0015514 A1* | 1/2010 | Miyagi ............... | H01M 4/131 |
| | | | 429/129 |

(Continued)

FOREIGN PATENT DOCUMENTS

| | | |
|---|---|---|
| JP | 6-168725 A | 6/1994 |
| JP | 2006-236752 A | 9/2006 |

(Continued)

OTHER PUBLICATIONS

Bingkun Guo, et al., "Electrochemical reduction of nano-SiO₂ in hard carbon as anode material for lithium ion batteries" Electrochemistry Communications 10, Sep. 2008, pp. 1876-1878.

*Primary Examiner* — Scott J. Chmielecki
(74) *Attorney, Agent, or Firm* — Oblon, McClelland, Maier & Neustadt, L.L.P.

(57) ABSTRACT

An electrode material for a nonaqueous electrolyte battery of the present embodiment includes a composite particle containing a carbonaceous material. A peak half-width of d-band measured from a Raman spectrum of the carbonaceous material is at 150 cm$^{-1}$ or more. A ratio Lc/La of a crystallite size Lc in a c-axis direction observed at 20° to 26° in a X-ray diffraction to a crystallite size La in an a-axis direction observed at 40° to 44° is 0.7 or less.

8 Claims, 5 Drawing Sheets

(56) References Cited

U.S. PATENT DOCUMENTS

| | | | |
|---|---|---|---|
| 2011/0135990 A1 | 6/2011 | Yamamoto et al. | |
| 2013/0078490 A1 | 3/2013 | Morita et al. | |
| 2013/0106355 A1* | 5/2013 | Kim .................... | H02J 7/0013 320/118 |
| 2013/0149606 A1 | 6/2013 | Yasuda et al. | |
| 2015/0194668 A1* | 7/2015 | Ueda .................... | H01M 4/587 429/231.4 |
| 2016/0164076 A1* | 6/2016 | Essaki .................. | H01M 4/366 429/158 |

FOREIGN PATENT DOCUMENTS

| | | |
|---|---|---|
| JP | 2009-224168 A | 10/2009 |
| JP | 2010-251283 A | 11/2010 |
| JP | 2012-14939 A | 1/2012 |
| JP | 2013-73764 A | 4/2013 |
| JP | 5584299 B2 | 7/2014 |
| JP | 2015-144101 A | 8/2015 |

\* cited by examiner

ELECTRODE MATERIAL, ELECTRODE, NONAQUEOUS ELECTROLYTE BATTERY INCLUDING THE SAME, AND BATTERY PACK

CROSS-REFERENCE TO RELATED APPLICATION

This application is based upon and claims the benefit of priority from Japanese Patent Application No. 2016-54568, filed Mar. 17, 2016, the entire contents of which are incorporated herein by reference.

FIELD

Embodiments described herein relate generally to an electrode material for a nonaqueous electrolyte battery, an electrode for a nonaqueous electrolyte battery, a nonaqueous electrolyte battery including the same, and a battery pack.

BACKGROUND

In recent years, accompanying with the popularization of a lithium ion secondary battery, there is an increasing demand for a battery which is capable of operating at higher voltage and has a higher energy density.

In general, a graphite-based material is used for a negative electrode of a lithium ion battery. Because a lithium ion is inserted into graphite layers so as to form the composition of $LiC_6$, the theoretical capacity of a general graphite-based material is 372 mAh/g ($LiC_6$). For this reason, the energy density has substantially reached the limit in a conventional lithium ion battery. In order to further improve the energy density of a lithium ion battery, it is necessary to select a new material. Therefore, the attention is payed to the materials that are alloyed with lithium such as silicon and tin. These materials have a lower potential than carbon and lithium, and have a large specific capacity.

Among these materials, silicon can insert lithium up to 4.4 lithium atoms with respect to 1 silicon atom in a molar ratio. Therefore, silicon can theoretically have 10 times the capacity of a graphite material. However, when a silicon particle inserts lithium atoms, the volume swells by about 3-4 times. For this reason, there are the problems that the repetition of charge and discharge cracks and pulverizes silicon particles, and affects the other members constituting the electrodes. In terms of suppressing the pulverization of silicon particles, it is effective to reduce a particle size. However, when reducing a particle size, aggregation is likely to occur. Therefore, the measures such as the coating a silicon particle with a silicon oxide or a carbonaceous material is implemented. However, the decrease in capacity due to repeated use is not sufficiently suppressed even in the aforementioned coated silicon particle.

On the other hand, it is known that a charge and discharge behavior of a lithium atom is shown even in the electrode obtained by using a silicon dioxide as an active material.

A detailed mechanism of charge and discharge by the silicon oxide is not yet known. Because the volume change of a silicon oxide is smaller than that of elemental silicon, the improvement of cycle life is expected. However, in the electrode in which an electrode active material is made of silicon oxide alone, the theoretical capacity and efficiency are low, and the energy density is small as compared with the electrode in which electrode active material is made of silicon (Si) and silicon monoxide (SAD).

Also, there is the known active material containing silicon and the silicon oxide represented by the general formula $SiO_x$ ($1.0 \leq x < 1.6$). The active material obtained by using a silicon oxide as a starting material forms the structure, in which silicon particles having a size of several nanometers are enclosed in silicon oxides through a disproportionation reaction caused by a thermal treatment. The fine silicon particles are likely to cause aggregation and grain growth in a charge and discharge process, and the improvement of life has not been achieved yet. On the contrary, cycle life is much shortened by introducing silicon.

Also, there is the known method of coating silicon oxide particles with a carbonaceous material followed by firing. In this method, about 60 mass % of a silicon oxide phase is reduced during the thermal treatment, to thereby produce the composite particle of the silicon oxide and the carbonaceous material $SiO_x$ ($0 < x \leq 1.5$). According to this method, the cycle characteristics are well improved. However, regarding the silicon oxide particle having the composition of $SiO_x$, it is consequently difficult to extend the cycle life for the same reasons as the aforementioned case of a composite material of silicon oxide and silicon.

DETAILED DESCRIPTION

Figure 1:
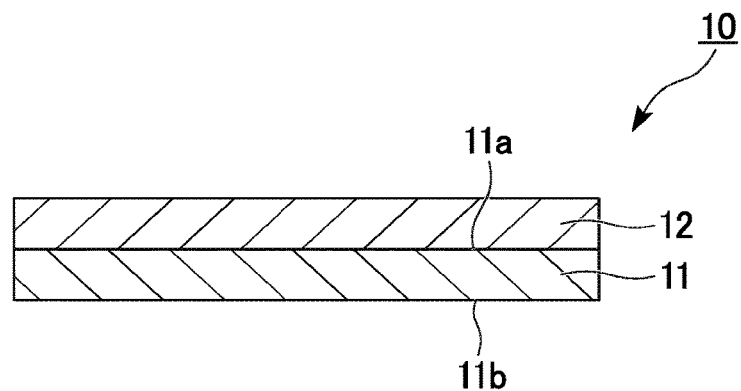
FIG. 1 is a cross-sectional view showing the schematic configuration of the electrode for a nonaqueous electrolyte battery according to the 2nd embodiment.

An electrode material for a nonaqueous electrolyte battery of the present embodiment includes a composite particle containing a carbonaceous material.

A peak half-width of d-band measured from a Raman spectrum of the carbonaceous material is at 150 cm$^{-1}$ or more.

A ratio Lc/La of a crystallite size Lc in a c-axis direction observed at 20° to 26° in a X-ray diffraction to a crystallite size La in an a-axis direction observed at 40° to 44° is 0.7 or less.

Hereinafter, the embodiments of an electrode material for a nonaqueous electrolyte battery, an electrode for a nonaqueous electrolyte battery, a nonaqueous electrolyte battery including the same, and a battery pack are described with reference to the drawings.

First Embodiment

The 1st embodiment provides an electrode material for a nonaqueous electrolyte battery including a composite particle containing a carbonaceous material, in which a peak half-width of the d-band measured from the Raman spectrum of the carbonaceous material is at 150 cm$^{-1}$ or more, and in a X-ray diffraction, a ratio Lc/La of a crystallite size Lc in the c-axis direction observed at 20° to 26° and a crystallite size La in the a-axis direction observed at 40° to 44° is 0.7 or less. By using this type of electrode material, it is possible to increase the initial charge and discharge efficiency and the cycle life, and consequently, it is possible to achieve the nonaqueous electrolyte battery excellent in energy density and long life.

The composite particle is a complex of a carbonaceous material, a metal and a metal oxide.

A metal is preferably at least one element selected from the group consisting of Si, Sn, Al, In, Ga, Pb, Ti, Ni, Mg, W, Mo and Fe, and a metal oxide is preferably at least one selected from the group consisting of oxides having the element and oxides containing an alloy having the element. The metal or the metal oxide can be used singly or in combination of plural types.

It is preferable that the metal and metal oxide are particles of a silicon and silicon oxide represented by the general formula $SiO_x$ ($0 \leq x \leq 2.0$).

In the present embodiment, the peak half-width of the d-band measured from the Raman spectrum of the carbonaceous material in the carbonaceous material-containing composite particle is 150 cm$^{-1}$ or more. When this peak half-width of the d-band is too small, the amorphous carbon region for reversible capacity decreases, and consequently the capacity decreases. Therefore, the peak half-width is set to 150 cm$^{-1}$ or more. The half-width of the d-band is preferably 180 cm$^{-1}$ or more, and more preferably 200 cm$^{-1}$ or more.

Further, in the present embodiment, in the X-ray diffraction, the ratio Lc/La of a crystallite size Lc in the c-axis direction observed at 20° to 26° to the crystallite size La in the a-axis direction observed at 40° to 44° is 0.7 or less. When this Lc/La is too large, it occurs that the charge and discharge efficiency tends to deteriorate. Therefore, the Lc/La is set to 0.7 or less. The Lc/La is preferably 0.6 or less, and more preferably 0.2 or more and 0.6 or less.

Preferable examples of the composite particles in the present embodiment include the particle including a carbonaceous material, silicon (Si), and a silicon oxide ($SiO_x$ ($0 \leq x \leq 2.0$)), wherein these are complexed. Silicon (Si) and a silicon oxide ($SiO_x$ ($0 \leq x \leq 2.0$)) are an active material.

The silicon of the present embodiment means the particle in which the molar ratio (O/Si) of O to Si is within a range of 0 or more and 0.2 or less when analyzing the composition of the composite particle that is the electrode material.

In the silicon oxide in the present embodiment, when the molar ratio (Si/SiO$_2$) of the silicon (Si) phase and the silicon dioxide (SiO$_2$) phase is 0.6 or more and 1.8 or less, the average size of the silicon dioxide phase holding and containing silicon is preferably 50 nm or more and 1000 nm or less. Also, regarding the silicon phase and the silicon dioxide phase, when a 16% volume cumulative diameter is defined as d16% and a 84% volume cumulative diameter is defined as d84%, the value (standard deviation/average size) obtained by dividing the standard deviation represented by (d84%−d16%)/2 by the average size is preferably 1.0 or less. It is preferable that the silicon phase and the silicon dioxide phase are dispersed in the carbonaceous material in the condition where the value (standard deviation/average size) is 1.0 or less.

The silicon phase inserts and extracts a large amount of lithium, and greatly enhances the capacity of the active material. In the present embodiment, the expansion and contraction of the silicon phase due to the insertion and extraction of a large amount of lithium in the silicon phase is relieved by dispersing this expansion and contraction into the other two phases (silicon oxide phase and carbonaceous material). Thus, it is possible to prevent the pulverization of the composite particles. Further, the carbonaceous material ensures an electroconductivity which is important for active materials. The silicon oxide phase is tightly bonded to silicon, to thereby maintain the particle structure as a buffer that holds the microparticulated silicon.

In the silicon phase, the expansion and contraction during the insertion and extraction of lithium is large. Therefore, it is preferable that the silicon phase be microparticulated as finely as possible and be dispersed in the composite particle in order to relieve this stress. Specifically, it is preferable that the silicon phase having a size of several nanometers or more and 100 nm or less be dispersed in the composite particle.

The silicon oxide phase forms an amorphous structure, a crystalline structure or the like. It is preferable that the silicon oxide phase be bonded to the silicon phase and dispersed evenly in the composite particle in the form of including or holding the silicon phase.

However, the microcrystalline silicons, which are held in the silicon oxide phase, are bonded to each other through the repetition of the insertion and extraction of lithium and the volume change during the charge and discharge. For this reason, the growth of the silicon crystal progresses, and the size of the crystal is increased. This causes the decrease in capacity and an initial charge and discharge efficiency.

Therefore, in this embodiment, the growth of the crystals of the microcrystalline silicon is inhibited by reducing and equalizing the size of the silicon oxide phase. Through this process, the capacity deterioration due to the charge and discharge cycle is suppressed, and the life characteristics are improved.

The average size of the silicon oxide phase is preferably 50 nm or more and 1000 nm or less, and more preferably 100 nm or more and less than 500 nm.

When the average size of the silicon oxide phase is within the aforementioned range, it is possible to obtain the good life characteristics.

When the average size of the silicon oxide phase is 50 nm or more, it is possible to uniformly disperse the silicon oxide phase in the production of the composite particle. Further, it is possible to prevent the problems such as the decrease in the rate characteristics due to the decrease in the electroconductivity of an active material, or the decrease in the initial charge and discharge capacity efficiency. When the average size of the silicon oxide phase is 1000 nm or less, it is possible to obtain the effect of suppressing the growth of the microcrystalline silicon.

Further, in order to obtain the good life characteristics in a whole active material, the size of the silicon oxide phase is preferably uniform. Specifically, regarding the silicon oxide phase, when a 16% volume cumulative diameter is defined as d16% and a 84% volume cumulative diameter is defined as d84%, the value (standard deviation/average size) obtained by dividing the standard deviation represented by (d84%−d16%)/2 by the average size is preferably 1.0 or less, and more preferably 0.5 or less.

The composite particle of the present embodiment can include a silicon dioxide.

The silicon dioxide of the present embodiment means the particle in which the molar ratio (O/Si) of O to Si is within a range of 1.8 or more and 2.0 or less when analyzing the composition other than a silicon component of the composite particle that is the electrode material. It is preferable that the silicon dioxide be the particle having no regular crystal structure. The silicon dioxide particle can partially include a crystalline phase, but a crystalline phase does not substantially contribute to charge and discharge. Thus, it is preferable that the silicon dioxide do not have a crystalline phase. Preferable examples of the silicon dioxide include a silicon dioxide in which a significant peak does not appear on an X-ray diffraction curve.

Regarding the silicon dioxide, as the particle size thereof becomes larger, more time is required for the diffusion of lithium during the initial charge, and the charge time becomes longer. This phenomenon is not preferable because this increases the possibility of the precipitation of lithium, i.e. dendrite formation.

Therefore, the average particle size of the silicon dioxide is preferably 5.0 nm or more and 80 nm or less. It is preferable that the average particle size of the silicon dioxide be much smaller, but it is difficult to produce the fine particle having an uniform particle size distribution. Also, as the silicon dioxide particle becomes finer, it becomes more difficult to disperse the silicon dioxide particles. When the average particle size of the silicon dioxide particles is within the aforementioned range, a dendrite is hardly formed, and the effect on the cycle life is small.

Herein, the average particle size is the value defined by the following analysis method.

In order to observe the microstructure within the composite particle, a part of the composite particle is subjected to a slicing process, and this part to be observed is further sliced by using an ion milling apparatus, etc. The inside of the composite particle is observed by Transmission Electron Microscope (TEM) at a magnification of 200,000 times or more. Then, at least 10 particles are selected in the diagonal of a field of view, and the longest diameters and the shortest diameters thereof are measured. Then, the measured values are averaged, to thereby obtain the average value. This average value is defined as the average particle size.

Regarding the silicon particle, as the particle size thereof becomes larger, the effect of the volume expansion on the surrounding structure becomes larger, and causes the deterioration of the cycle characteristics. For this reason, it is preferable that the particle size be smaller. However, when the particle size is less than 20 nm, the silicon particles are likely to be aggregated, and it becomes difficult to uniformly disperse the silicon particles in the composite particle. In addition, the attention is required in terms of safety.

In the electrode material for a nonaqueous electrolyte battery according to the present embodiment, the peak intensity ratio Id/Ig of the peak intensity Id of the d-band measured from the Raman spectrum of the carbonaceous material to the peak intensity Ig of the g-band is 1.3 or less.

When Id/Ig is too large, the amorphous carbon region for reversible capacity increases, and consequently the charge and discharge efficiency is deteriorated. Therefore, Id/Ig is set to 1.3 or less. Id/Ig is preferably 1.2 or less, and more preferably 1.1 or less.

A lithium silicate such as $Li_4SiO_4$ may be dispersed on the surface or at the inside of the silicon oxide phase. It is considered that a lithium silicate is formed by the solid reaction of the lithium salt added to the carbonaceous material and the silicon oxide phase in the composite particle during a thermal treatment.

The particle size of the electrode active material formed of silicon (Si) and silicon oxide ($SiO_2$) is preferably 5 μm or more and 100 μm or less, and the specific surface area is preferably 0.5 $m^2$/g or more and 10 $m^2$/g or less.

The particle size and the specific surface area of the electrode active material affect the rate of the insertion and extraction reaction of lithium, and significantly affect the electrode characteristics. When the particle size and the specific surface area of the electrode active material are within the ranges described above, the electrode can exert stable electrode characteristics.

The half-width of the diffraction peak of Si (220) plane in a powder X-ray diffraction measurement of the electrode active material is preferably 1.5° or more and 8.0° or less.

The half-width of the diffraction peak of Si (220) plane decreases as the crystal grains of the silicon phase are grown. When the crystal grains of the silicon phase grow larger, cracks and the like is likely to occur in the electrode active material particles due to the expansion and contraction caused by the insertion and extraction of lithium. When the aforementioned half-width is within a range of 1.5° or more and 8.0° or less, it is possible to avoid that the aforementioned problem appears.

In the composite particles of the present embodiment, regarding the ratio of the silicon phase, the silicon oxide phase and the carbonaceous material, the molar ratio (silicon/carbon) of silicon to carbon is preferably 0.2 or more and 2 or less.

The composite particle may have the silicon carbide phase.

The silicon carbide phase may be added as a particle, and may be produced by reacting the silicon particle and the carbon material during the thermal treatment in the production of the composite particle. When being heated at 1000° C. or more in an inert atmosphere, the fine silicon particle reacts with carbon so as to form the silicon carbide phase.

The presence of the silicon carbide phase can be confirmed by the measurement using a powder X-ray diffraction of the composite particle.

The silicon carbide phase is inactive to lithium in itself, and does not affect the charge characteristics at all. However, when this phase exists, the silicon carbide phase plays a role of suppressing the aggregation and grain growth of the silicon particles existing around and the silicon phase formed by charge and discharge during the cycle. For this reason, it is possible to improve the cycle life.

However, the formation of the silicon carbide phase through the reaction of carbon means that the originally existing silicon component decreases, and the capacity decreases. Thus, it is not preferable to form the silicon carbide phase in an amount more than necessary by increasing the temperature of the firing and the like. It is preferable to adjust the temperature of the thermal treatment to 1200° C. or less. Also, it has been confirmed from the results of experiments that, even when the silicon carbide phase exists, there is no significant effect on initial efficiency, and initial efficiency does not decrease.

A $SiO_2$ precursor and a lithium compound may be contained in the carbonaceous material covering the silicon phase and the silicon oxide phase. When the carbonaceous material contains these materials, the bond between $SiO_2$ produced from SiO and carbonaceous material is strengthened, and $Li_4SiO_4$ excellent in lithium ion conductivity is produced in the silicon oxide phase. It is preferable that the carbonaceous material enclose the silicon phase and the silicon oxide phase.

Examples of a $SiO_2$ precursor include alkoxides such as silicon ethoxide.

Examples of a lithium compound include lithium carbonate, lithium oxide, lithium hydroxide, lithium oxalate, and lithium chloride.

Next, the production method of the electrode material for a nonaqueous electrolyte battery according to the embodiment is described.

The electrode material obtained in the 1st embodiment is the carbonaceous material of Lc=3 to 30 Å and La=4.3 to 43 Å, and the raw material which forms non-graphitizable carbon is used. Moreover, by using the raw material having the structure, in which the aromatic ring-packed crystal domains are formed in the previous step of firing, among these raw materials, it is possible to achieve Lc/La<0.7. This is because the carbonization progresses while maintaining this structure during firing. Thus, the graphitization is suppressed, and also, the growth in the stacking direction does not progress. In this type of carbonaceous material, the amorphous carbonaceous part, which reversibly inserts and extract lithium, is also moderately formed in addition to the graphite structure region, and it is possible to obtain the excellent capacity and efficiency. Also, when Lc exceeds 30 Å and La exceeds 43 Å, the increase in the amount of the heat generated by internal short-circuit becomes remarkable, which may have an adverse effect on the safety. Therefore, it is preferable to maintain Lc and La within a crystallite size.

(Complexing Process)

First, the silicon dioxide particle and the silicon particle are prepared as the raw material powder.

The silicon dioxide particles, the silicon particles and the carbon precursor are mixed, and the resultant mixture is subjected to the thermal treatment, to thereby thermally decompose the carbon precursor. In this manner, the composite particle is produced.

As the carbon precursor to be carbonized by the thermal treatment, it is possible to use a resin-based material or a non-resin-based material.

In order to uniformly mix the silicon dioxide particles and the silicon particles, the carbon precursor is preferably soluble in a liquid or a dispersion medium in the mixing stage, and is particularly preferably a liquid and a readily polymerizable monomer or oligomer.

Examples of a resin-based material include a furan resin, a xylene resin, a ketone resin, an amino resin, a melamine resin, a urea resin, an aniline resin, a urethane resin, a polyimide resin, a polyester resin, a phenolic resin, a resole resin, a novolac resin and a polyvinyl alcohol.

Examples of the non-resin-based material include sucrose and ascorbic acid.

Herein, it is preferable to use, as the main carbon precursor, a resin having a lot of aromatic rings in a structure such as a novolac resin, an aromatic polyimide resin, and a bismaleimide resin having an aromatic ring and 2 or more maleimide groups in the basic structure because it is possible to efficiently form the desired composite particle.

When mixing the silicon dioxide particles, the silicon particles and the carbon precursor, particles that act as the electroconductive auxiliary agent can be added to improve conductivity.

As the conductive auxiliary agent, it is possible to preferably use a carbon material such as highly crystalline graphite, a carbon nanofiber or a carbon nanotube; or a microparticle such as acetylene black. Graphite is preferable in terms of improving the conductivity and capacity of the electrode material. Also, graphite can coat the whole composite particle, and has a large effect to relieve the expansion and contraction.

It is preferable that the complexing of the silicon dioxide particles, the silicon particles and the carbon precursor be carried out by mixing those in a dispersion medium in a liquid phase in order to dispersing these materials more uniformly.

As the dispersion medium, an organic solvent or water, etc. can be used, and it is preferable to use a liquid having a good affinity for the silicon dioxide particle, the silicon particle and the carbon precursor. Examples of the dispersion medium include ethanol, acetone, isopropyl alcohol, methyl ethyl ketone, ethyl acetate and N-methyl-2-pyrrolidone (NMP).

The mixing and stirring treatment for the silicon dioxide particles, the silicon particles and the carbon precursor can be carried out by using various types of stirring device, a ball mill, and a bead mill. The mixing and stirring treatment can be carried out by using 1 type alone or the combination of 2 types or more of the aforementioned devices.

The mixing and stirring treatment is not limited to the aforementioned mixing in a liquid, and for example, the mixture can be produced by kneading or extrusion molding using a small amount of solvent.

After mixing, the mixture is dried to remove the solvent.

As the drying method, it is possible to use a method for drying the mixture under reduced pressure while homogenizing the mixture using an evaporator, etc. Alternatively, it is possible to use a method such as spray drying.

After drying, the material that requires a curing treatment for polymerization is put and heated in an electric furnace, to thereby carry out a curing treatment. The conditions for a curing treatment are appropriately adjusted depending on the type of the carbon precursor, and it is preferable to carry out the heating at 120° C. or more and 200° C. or less for at least 1 hour.

(Carbonization and Firing Treatment)

For example, the carbonization and firing of the aforementioned composite particle is carried out under an inert atmosphere such as argon (Ar). The atmosphere during the carbonization and firing of the composite particles is not limited to an inert atmosphere, but can be a nitrogen atmosphere or a mixed atmosphere of argon containing hydrogen.

The temperature during the carbonization and firing of the aforementioned composite particle is appropriately adjusted depending on the thermal decomposition temperature of the carbon precursor contained in the composite particle, and it is preferable that the temperature be 900° C. or more and 1200° C. or less. In the process of the thermal treatment, it is possible to simultaneously form the silicon carbide phase. The silicon particle and the carbon precursor are reacted at a temperature of more than 1000° C., which produces the silicon carbide phase.

It is not preferable that the temperature of carbonization and firing exceed 1200° C. because the carbonization and silicidation of the silicon particle and the carbon precursor proceed more than necessary, and the discharge capacity significantly decreases. The more preferable range of the temperature of the thermal treatment is 1000° C. or more and 1100° C. or less.

The firing time is preferably 10 minutes or more and 12 hours or less.

The silicon carbide phase can be confirmed by performing X-ray diffraction measurement of the produced composite particle.

Through the synthesis method described above, it is possible to obtain the electrode material according to the present embodiment.

Regarding the product (electrode material) of the carbonization and firing, the particle size and specific surface area, etc. may be appropriately adjusted to predetermined ranges by using various mills, a pulverizing device and a grinder, etc.

The electrode material for a nonaqueous electrolyte battery according to the 1st embodiment includes the composite particle containing the carbonaceous material, wherein a peak half-width of d-band measured from the Raman spectrum of the carbonaceous material is at 150 cm$^{-1}$ or more, and the ratio La/Lc of a crystallite size Lc in a c-axis direction observed at 20° to 26° in a X-ray diffraction to a crystallite size La in an a-axis direction observed at 40° to 44° is 0.7 or less. By using this type of electrode material, it is possible to increase the initial charge and discharge efficiency and the cycle life, and consequently, it is possible to achieve the nonaqueous electrolyte battery excellent in energy density and long life.

Second Embodiment

The 2nd embodiment provides the electrode for a nonaqueous electrolyte battery including a current collector; and the electrode mixture layer that is formed on the current collector and contains the aforementioned electrode material for a nonaqueous electrolyte battery according to the 1st embodiment, an electroconductive agent and a binder (hereinafter, may be abbreviated as the "electrode").

FIG. 1 is a cross-sectional view showing the schematic configuration of the electrode for a nonaqueous electrolyte battery according to the present embodiment.

The electrode 10 according to the present embodiment includes the sheet-shaped current collector 11; and the electrode mixture layer (the electrode active material layer) 12 as shown in FIG. 1. This electrode 10 is used as, for example, the negative electrode for a nonaqueous electrolyte battery described below.

The electrode mixture layer 12 is the layer which is formed on at least one surface 11a of the current collector 11 and contains the aforementioned electrode material for a nonaqueous electrolyte battery according to the 1st embodiment, the electroconductive agent and the binder. In other words, the electrode mixture layer 12 is the layer in which the electrode material according to the 1st embodiment is supported on at least one surface 11a of the current collector 11.

The binder fills the gap between the electrode materials constituting the electrode mixture layer 12 so as to bind the electrode materials with each other or the electrode material with the electroconductive agent and to bond the current collector 11 and the electrode mixture layer 12.

The electroconductive agent and the binder are optional components. Herein, the electrode mixture layer 12 may also be formed on the other surface 11b of the current collector 11.

The current collector 11 is the electroconductive member to be bound with the electrode mixture layer 12. As the current collector 11, it is possible to use an electroconductive substrate having a porous structure or a non-porous electroconductive substrate. These electroconductive substrates can be formed of an electroconductive material such as copper, nickel, an alloy thereof or stainless steel. Of these electroconductive substrates, copper (including a copper alloy) and stainless steel are the most preferable in terms of electroconductivity.

Also, it is preferable that the thickness of the current collector 11 be 5 µm or more and 20 µm or less. When the thickness of the current collector 11 is within the aforementioned range, it is possible to achieve the balance between electrode strength and reduction in weight.

The thickness of the electrode mixture layer 12 is preferably 1.0 µm or more and 150 µm or less, and more preferably 30 µm or more and 100 µm or less. Therefore, when the electrode mixture layer 12 is supported on both surface of the current collector 11, the total thickness of the electrode mixture layers 12 is preferably 2.0 µm or more and 300 µm or less, and more preferably 60 µm or more and 200 µm or less.

When the thickness of the electrode mixture layer 12 is within the aforementioned range, the large current discharge characteristics and cycle life of the nonaqueous electrolyte battery are significantly improved.

Examples of the electroconductive agent include acetylene black, carbon black and graphite.

As the binder, it is possible to use at least one selected from the group consisting of polytetrafluoroethylene (PTFE), polyvinylidene fluoride (PVdF), polyacrylic acid, alginic acid, polysaccharides and their derivatives such as cellulose, ethylene-propylene-diene copolymer (EPDM), styrene-butadiene rubber (SBR), polyimide, or polyamide. Among these, polyimide is particularly preferred. It is possible to use 1 type alone or the combination of 2 types or more of the binder.

The electrode 10 excellent in life property can be obtained by using the combination of the binder having excellent binding property between the electrode materials and the binder having excellent binding property between the electrode material and the current collector 11, or the combination of the binder having high hardness and the binder having excellent flexibility.

In the present embodiment, the interfacial binding strength between the current collector 11 and the electrode mixture layer 12 is important, and polyamide-imide and polyimide are more preferable as the binder because it is possible to bind the current collector and the electrode mixture layer with a higher binding strength.

Next, the production method of the electrode 10 is described.
(Formation of Electrode Mixture Layer)

The aforementioned electrode 10 is produced by using the electrode material produced by the aforementioned method.

Firstly, the electrode material and the binder are suspended in a general solvent so as to prepare a slurry. Herein, the electroconductive agent is added thereto as necessary so as to prepare a slurry.

Subsequently, the slurry is applied onto at least one surface 11a of the current collector 11 followed by drying to form the active material-containing coating film.

Thereafter, the coating film on the current collector 11 is rolled to thereby form the electrode mixture layer 12.

Also, the mixture containing the electrode material, the electroconductive agent and the binder is molded in a pellet shape, and this pellet-shaped mixture is placed on at least one surface 11a of the current collector 11. Through this process, it is possible to form the electrode mixture layer 12.

As described above, it is possible to obtain the electrode 10 according to the present embodiment.

According to the electrode 10 for a nonaqueous electrolyte battery of the present embodiment, the electrode mixture layer 12 includes the electrode material according to the 1st embodiment, and therefore, it is possible to improve the initial charge and discharge efficiency and cycle life, and to achieve the nonaqueous electrolyte battery excellent in energy density and long life.

Third Embodiment

The 3rd embodiment provides the nonaqueous electrolyte battery including the negative electrode prepared by using the aforementioned electrode for a nonaqueous electrolyte battery according to the 2nd embodiment, a positive electrode, a nonaqueous electrolyte, a separator and an exterior material.

More specifically, the nonaqueous electrolyte battery according to the present embodiment includes an exterior material, a positive electrode that is housed in the exterior material, the negative electrode that is spatially separated from the positive electrode and is housed in the exterior material with a separator interposed therebetween, and a nonaqueous electrolyte charged in the exterior material.

Hereinafter, the negative electrode, the positive electrode, the nonaqueous electrolyte, the separator and the exterior material, which are constituent members of the nonaqueous electrolyte battery according to the present embodiment, are described in detail.

(1) Negative Electrode

As the negative electrode, the aforementioned electrode according to the 2nd embodiment is used.

(2) Positive Electrode

The positive electrode includes the positive electrode current collector and the positive electrode mixture layer that is formed on one surface or both surfaces of the positive electrode current collector and contains a positive electrode active material, an electroconductive agent and a binder. An electroconductive agent and a binder are optional components.

As the positive electrode active material, various oxides can be used, and examples of oxides include manganese dioxide, a lithium-manganese composite oxide, a lithium-containing cobalt oxide (such as $LiCoO_2$), a lithium-containing nickel-cobalt oxide (such as $LiNi_{0.8}Co_{0.2}O_2$) and a lithium-manganese composite oxide (such as $LiMn_2O_4$ or $LiMnO_2$). As the positive electrode active material, these compounds can be used alone or in combination of two or more. It is preferable to use these positive electrode active materials because the nonaqueous electrolyte battery can have a high voltage.

The electroconductive agent improves the current collection performance of the positive electrode active material and suppresses contact resistance between the positive electrode active material and the positive current collector.

Examples of the electroconductive agent include agents containing acetylene black, carbon black, artificial graphite, natural graphite, a carbon fiber, and an electroconductive polymer.

It is possible to use 1 type alone or the combination of 2 types or more of the electroconductive agent.

The binder fills the gap between the dispersed positive electrode active materials so as to bind the positive electrode active material and the electroconductive agent and to bind the positive electrode active material and the positive electrode current collector.

Examples of the binder include polytetrafluoroethylene (PTFE), polyvinylidene fluoride (PVdF), fluorine-based rubber, styrene-butadiene rubber (SBR), polypropylene (PP), polyethylene (PE), carboxymethyl cellulose (CMC), polyimide (PI), and polyacrylimide (PAI).

It is possible to use 1 type alone or the combination of 2 types or more of the binder.

Also, examples of an organic solvent for dispersing the binder include N-methyl-2-pyrrolidone (NMP) and dimethylformamide (DMF).

Regarding the blending ratio of the positive electrode active material, the electroconductive agent and the binder in the positive electrode mixture layer, it is preferable that the positive electrode active material is blended within a range of 80 mass % to 95 mass %, the electroconductive agent is blended within a range of 3 mass % to 20 mass %, and the binder is blended within a range of 2 mass % to 7 mass %.

The positive electrode current collector is the electroconductive member to be bound with the positive electrode mixture layer. As the positive electrode current collector, an electroconductive substrate having a porous structure or a non-porous electroconductive substrate can be used.

The thickness of the positive electrode current collector is preferably within a range of 5 μm to 20 μm. When the thickness of the positive electrode current collector is within the range, it is possible to achieve the balance between electrode strength and reduction in weight.

Next, the production method of the positive electrode is described.

Firstly, the positive electrode active material, the electroconductive agent and the binder are suspended in a general solvent so as to prepare slurry.

Subsequently, the slurry is applied on the positive electrode current collector followed by drying to form the positive electrode mixture layer. Then, the positive electrode mixture layer is subjected to pressing, to thereby obtain the positive electrode.

Also, the positive electrode can be produced by molding the positive electrode active material, the binder and the electroconductive agent to be blended according to need in a pellet shape to form the positive electrode mixture layer, and disposing this positive electrode mixture layer on the positive electrode current collector.

(3) Nonaqueous Electrolyte

As the nonaqueous electrolyte, a nonaqueous electrolyte solution, an electrolyte-impregnated polymer electrolyte, a polymer electrolyte or an inorganic solid electrolyte are used.

A nonaqueous electrolyte solution is a liquid nonaqueous electrolyte prepared by dissolving an electrolyte in a nonaqueous solvent (an organic solvent), and is held in the gap in the electrode group.

As a nonaqueous solvent, it is preferable to use the nonaqueous solvent which mainly contains the mixed solvent of cyclic carbonates (hereinafter, referred to as the "1st solvent") such as ethylene carbonate (EC), propylene carbonate (PC) and vinylene carbonate, and nonaqueous solvents having lower viscosity than the cyclic carbonates (hereinafter, referred to as the "2nd solvent").

Examples of the 2nd solvent include chain carbonates such as dimethyl carbonate (DMC), diethyl carbonate (DEC) and methylethyl carbonate (MEC); cyclic ethers such as tetrahydrofuran and 2-methyltetrahydrofuran; chain ethers such as dimethoxyethane and diethoxyethane; ethyl propionate; methyl propionate; γ-butyrolactone (GBL); acetonitrile (AN); ethyl acetate (EA); toluene; xylene; and methyl acetate (MA). It is preferable that the 2nd solvent have a donor number of 16.5 or less. It is preferable that the viscosity of the 2nd solvent be 2.8 cP or less at 25° C. Herein, 1 cP is converted into 1 mPa·s.

It is preferable that the blending amount of ethylene carbonate or propylene carbonate in the mixed solvent be 10 vol % to 80 vol %. More preferable blending amount of ethylene carbonate or propylene carbonate is 20 vol % to 75 vol %.

Examples of an electrolyte contained in a nonaqueous electrolyte include lithium salts such as lithium perchlorate ($LiClO_4$), lithium hexafluorophosphate ($LiPF_6$), lithium tetrafluoroborate ($LiBF_4$), lithium hexafluoroarsenate ($LiAsF_6$), and lithium trifluoromethanesulfonate ($LiCF_3SO_3$).

Among these, it is preferable to use lithium hexafluorophosphate or lithium tetrafluoroborate.

It is preferable that the dissolving amount of the electrolyte relative to the nonaqueous solvent contained in nonaqueous electrolyte be 0.5 mol/L or more and 2.0 mol/L or less.

(4) Separator

The separator is placed between the positive electrode and the negative electrode in order to prevent the positive electrode and the negative electrode from having contact with each other. The separator is comprised of an insulating material.

The shape, by which an electrolyte can move between the positive electrode and the negative electrode, is used for the separator. The separator is formed of a porous film containing polyethylene (PE), polypropylene (PP), cellulose or polyvinylidene fluoride (PVdF), or a nonwoven fabric made of a synthetic resin, for example. Among these, a porous film formed of at least one of polyethylene and polypropylene is preferable because it is possible to improve the safety of a secondary battery.

It is preferable that the thickness of the separator be 5 μm or more and 30 μm or less. When the thickness of the separator is less than 5 μm, the strength of the separator is significantly deteriorated, and the internal short circuit is likely to occur. Meanwhile, when the thickness of the separator is more than 30 μm, the distance between the positive and negative electrodes is increased, and the internal resistance may be increased.

When the separator is allowed to stand for 1 hour at 120° C., the thermal shrinkage percentage is preferably 20% or less and more preferably 15% or less. When the thermal shrinkage percentage of the separator is more than 20%, the possibility that the short circuit is caused by heating is increased.

The porosity of the separator is preferably 30 vol % to 70 vol % and more preferably 35 vol % to 70 vol %.

The surface of the separator can be coated with ceramic particles. Through this coating, it is possible to improve the safety of the separator. Examples of ceramic particles include $Al_2O_3$, $TiO_2$ and $ZrO_2$.

(5) Exterior Material

As the exterior material which houses the positive electrode, the negative electrode and the nonaqueous electrolyte, it is possible to use a metal container or an exterior container made of a laminated film.

As a metal container, it is possible to use the metal can formed of aluminum, an aluminum alloy, iron or stainless steel in a rectangular or cylindrical shape.

As an aluminum alloy, an alloy containing an element such as magnesium, zinc or silicon is preferred. When a transition metal such as iron, copper, nickel or chromium is contained in the aluminum alloy, the content of the transition metal is preferably 100 ppm or less. Because the metal container made of the aluminum alloy has the much greater strength than the metal container made of aluminum, the thickness of the metal container can be reduced. As a result, it is possible to realize the thin and lightweight nonaqueous electrolyte battery which has high power and excellent heat radiation property.

Examples of a laminated film include a multi-layer film in which an aluminum foil is coated with a resin film. As a resin constituting a resin film, it is possible to use a polymer compound such as polypropylene (PP), polyethylene (PE), nylon or polyethylene terephthalate (PET).

Herein, the present embodiment can be applied to the nonaqueous electrolyte battery having various shapes such as a flat type (thin type), a square type, a cylindrical type, a coin type and a button type.

Also, the nonaqueous electrolyte battery according to the present embodiment can further include a lead which is electrically connected to the electrode group containing the positive electrode and the negative electrode. For example, the nonaqueous electrolyte battery according to the present embodiment can include two leads. In this case, one of the leads is electrically connected to the positive electrode current collector tab and the other lead is electrically connected to the negative electrode current collector tab.

The material of the lead is not particularly limited, but for example, it is possible to use the same material for the positive electrode current collector and the negative electrode current collector.

The nonaqueous electrolyte battery according to the present embodiment can further include a terminal which is electrically connected to the aforementioned lead and is drawn from the aforementioned exterior material. For example, the nonaqueous electrolyte battery according to the present embodiment can include two terminals. In this case, one of the terminals is connected to the lead which is electrically connected to the positive electrode current collector tab and the other terminal is connected to the lead which is electrically connected to the negative electrode current collector tab.

The material of the terminal is not particularly limited, but for example, the same material for the positive electrode current collector and the negative electrode current collector is used.

(6) Nonaqueous Electrolyte Battery

Figure 2:
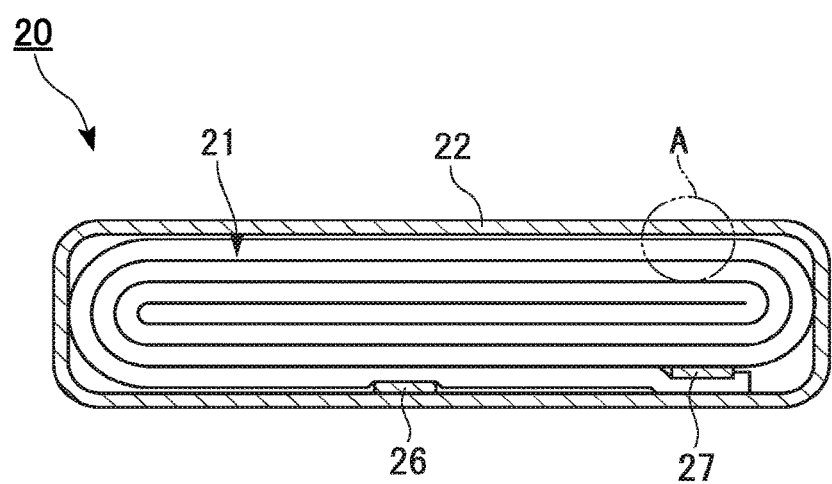
FIG. 2 is a schematic view showing the nonaqueous electrolyte battery according to the 3rd embodiment.
Figure 3:
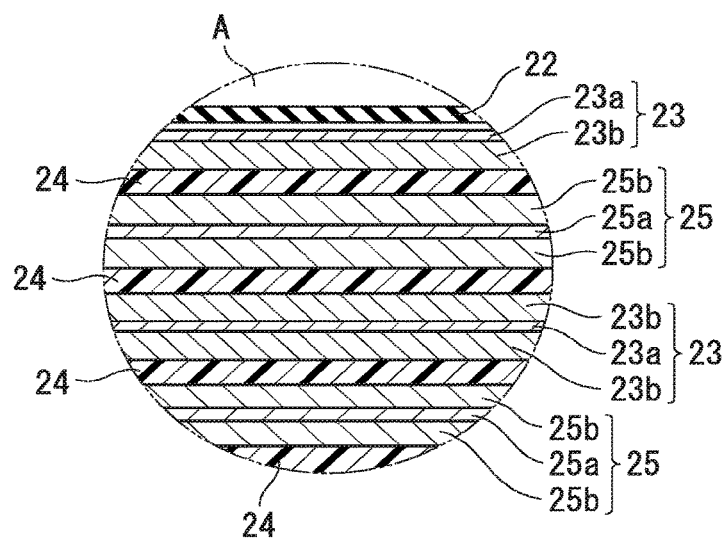
FIG. 3 is a schematic view showing the nonaqueous electrolyte battery according to the 3rd embodiment.

Next, the flat type nonaqueous electrolyte battery (nonaqueous electrolyte battery) 20 shown in FIG. 2 and FIG. 3 is described as an example of the nonaqueous electrolyte battery according to the present embodiment. FIG. 2 is a schematic cross-sectional view showing the flat type nonaqueous electrolyte battery 20. FIG. 3 is an enlarged cross-sectional view showing the part A shown in FIG. 2. These drawings are schematic diagrams for describing the nonaqueous electrolyte battery according to the embodiment. The shapes, dimensions, ratios, and the like are different from those of actual device at some parts, but design of the shape, dimensions, ratios, and the like can be appropriately modified in consideration of the following description and known technologies.

The flat type nonaqueous electrolyte battery 20 shown in FIG. 2 is configured such that the winding electrode group 21 with a flat shape is housed in the exterior material 22. The exterior material 22 may be a container obtained by forming a laminated film in a bag-like shape or may be a metal container. Also, the winding electrode group 21 with the flat shape is formed by spirally winding the laminated product obtained by laminating the negative electrode 23, the separator 24, the positive electrode 25 and the separator 24 from the outside, i.e. the side of the exterior material 22, in this order, followed by performing press-molding. As shown in FIG. 3, the negative electrode 23 located at the outermost periphery has the configuration in which the negative electrode layer 23b is formed on one surface of the negative electrode current collector 23a on the inner surface side. The negative electrodes 23 at the parts other than the outermost periphery have the configuration in which the negative electrode layers 23b are formed on both surfaces of the negative current collector 23a. Also, the positive electrode 25 has the configuration in which the positive electrode layers 25b are formed on both surfaces of the positive current collector 25a. Herein, a gel-like nonaqueous electrolyte can be used instead of the separator 24.

In the vicinity of the outer peripheral end of the winding electrode group 21 shown in FIG. 2, the negative electrode terminal 26 is electrically connected to the negative current collector 23a of the negative electrode 23 of the outermost periphery. The positive electrode terminal 27 is electrically connected to the positive current collector 25a of the inner positive electrode 25. The negative electrode terminal 26 and the positive electrode terminal 27 extend toward the outer portion of the exterior material 22, and are connected to the extraction electrodes included in the exterior material 22.

When manufacturing the nonaqueous electrolyte battery 20 including the exterior material formed of the laminated film, the winding electrode group 21 to which the negative electrode terminal 26 and the positive electrode terminal 27 are connected is charged in the exterior material 22 having the bag-like shape with an opening. Subsequently, the liquid nonaqueous electrolyte is injected from the opening of the exterior material 22. Then, the opening of the exterior material 22 with the bag-like shape is subjected to heat-sealing in the state of sandwiching the negative electrode terminal 26 and the positive electrode terminal 27 therebetween, to thereby completely seal the winding electrode group 21 and the liquid nonaqueous electrolyte.

Also, when manufacturing the nonaqueous electrolyte battery 20 having the exterior material formed of the metal container, the winding electrode group 21 to which the negative electrode terminal 26 and the positive electrode terminal 27 are connected is charged in the metal container having an opening. Subsequently, the liquid nonaqueous electrolyte is injected from the opening of the exterior material 22. Then, the opening is sealed by mounting a cover member on the metal container.

For the negative electrode terminal 26, it is possible to use, for example, the material having electric stability and electroconductivity when a potential with respect to lithium is within a range of 0 V or more and 3 V or less. Specific examples of this material include aluminum and an aluminum alloy containing an element such as Mg, Ti, Zn, Mn, Fe, Cu or Si. Also, it is more preferable that the negative electrode terminal 26 be formed of the same material as the negative current collector 23a in order to reduce the contact resistance with the negative current collector 23a.

For the positive electrode terminal 27, it is possible to use the material having electric stability and electroconductivity when a potential with respect to lithium is within a range of 2 V or more and 4.25 V or less. Specific examples of this material include aluminum and an aluminum alloy containing an element such as Mg, Ti, Zn, Mn, Fe, Cu or Si. It is more preferable that the positive electrode terminal 27 be formed of the same material as the positive current collector 25a in order to reduce the contact resistance with the positive current collector 25a.

Hereinafter, the exterior material 22, the negative electrode 23, the positive electrode 25, the separator 24, and the nonaqueous electrolyte which are constituent members of the nonaqueous electrolyte battery 20 is described in detail.

(1) Exterior Material

As the exterior material 22, the aforementioned exterior material is used.

(2) Negative Electrode

As the negative electrode 23, the aforementioned electrode according to the 2nd embodiment is used.

(3) Positive Electrode

As the positive electrode 25, the aforementioned positive electrode is used.

(4) Separator

As the separator 24, the aforementioned separator is used.

(5) Nonaqueous Electrolyte

As the nonaqueous electrolyte, the aforementioned nonaqueous electrolyte is used.

Figure 4:
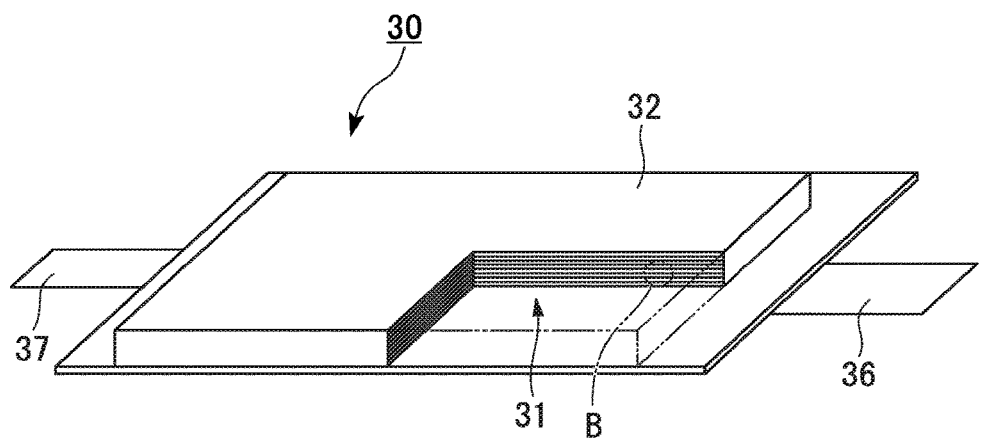
FIG. 4 is a schematic view showing the nonaqueous electrolyte battery according to the 3rd embodiment.
Figure 5:
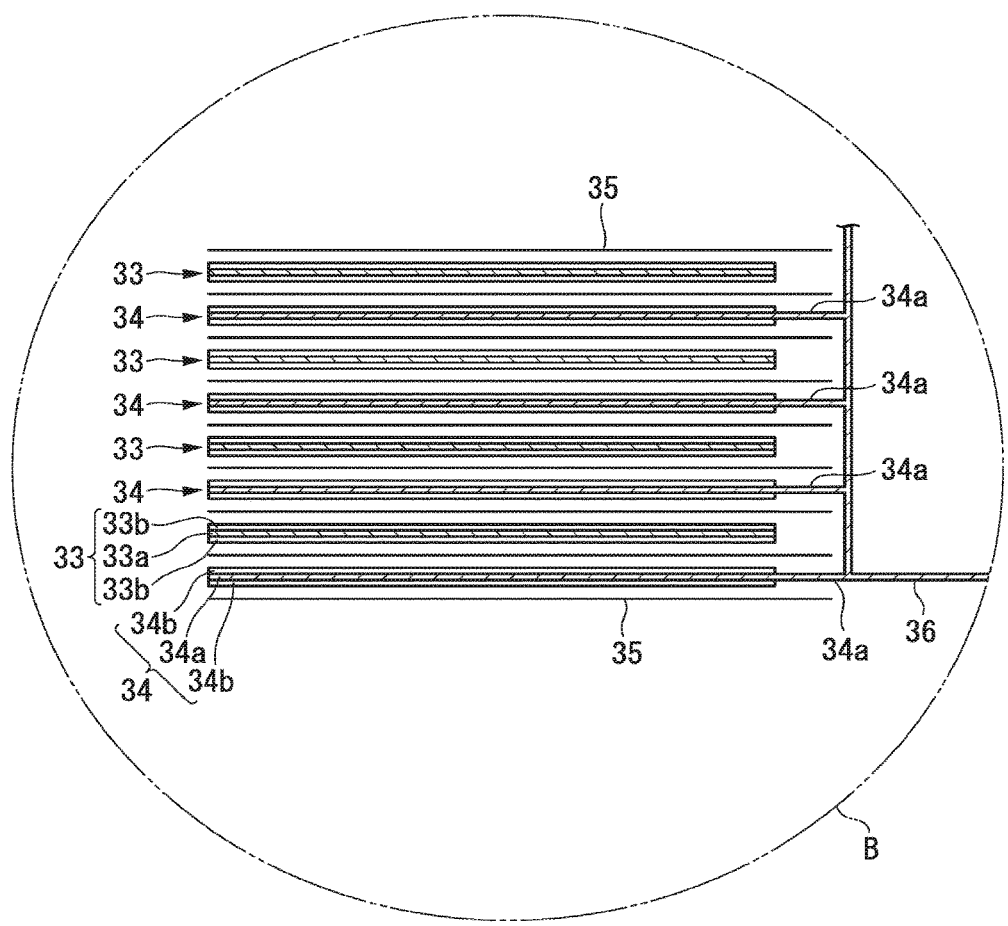
FIG. 5 is a schematic view showing the nonaqueous electrolyte battery according to the 3rd embodiment.

The configuration of the nonaqueous electrolyte battery according to the 3rd embodiment is not limited to the aforementioned configuration shown in FIG. 2 and FIG. 3. For example, it is possible to use the batteries having the configurations shown in FIG. 4 and FIG. 5. FIG. 4 is a partial cutout perspective view schematically showing another flat type nonaqueous electrolyte battery according to the 3rd embodiment. FIG. 5 is an enlarged schematic sectional view showing the part B of FIG. 4.

The nonaqueous electrolyte battery 30 shown in FIG. 4 and FIG. 5 is configured such that the lamination type electrode group 31 is housed in the exterior member 32. As shown in FIG. 5, the lamination type electrode group 31 has the structure in which the positive electrodes 33 and negative electrodes 34 are alternately laminated while interposing separators 35 therebetween.

The plurality of positive electrodes 33 is present and each includes the positive electrode current collector 33a and the positive electrode layers 33b supported on both surfaces of the positive electrode current collector 33a. The positive electrode layer 33b contains the positive electrode active material.

The plurality of negative electrodes 34 is present and each includes the negative electrode current collector 34a and the negative electrode layers 34b supported on both surfaces of the negative electrode current collector 34a. The negative electrode layer 34b contains the negative electrode material. One side of the negative electrode current collector 34a of each negative electrode 34 protrudes from the negative electrode 34. The protruding negative electrode current collector 34a is electrically connected to a strip-shaped negative electrode terminal 36. The front end of the strip-shaped negative electrode terminal 36 is drawn from the exterior member 32 to the outside. Although not shown in the figure, in the positive electrode current collector 33a of the positive electrode 33, the side located opposite to the protruding side of the negative electrode current collector 34a protrudes from the positive electrode 33. The positive electrode current collector 33a protruding from the positive electrode 33 is electrically connected to the strip-shaped positive electrode terminal 37. The front end of the strip-shaped positive electrode terminal 37 is located on an opposite side to the negative electrode terminal 36, and is drawn from the side of the exterior member 32 to the outside.

The material, a mixture ratio, dimensions, and the like of each member included in the nonaqueous electrolyte battery 30 shown in FIG. 4 and FIG. 5 are configured to be the same as those of each constituent member of the nonaqueous electrolyte battery 20 described in FIG. 2 and FIG. 3.

According to the present embodiment described above, it is possible to provide the nonaqueous electrolyte battery.

The nonaqueous electrolyte battery according to the present embodiment includes the negative electrode, the positive electrode, the nonaqueous electrolyte, the separator and the exterior material. The negative electrode is comprised of the aforementioned negative electrode for a nonaqueous electrolyte battery according to the 2nd embodiment. For these reasons, the nonaqueous electrolyte battery according to the present embodiment is excellent in energy density and long life.

Fourth Embodiment Next, the battery pack according to the 4th embodiment is described in detail.

The battery pack according to the present embodiment includes at least one nonaqueous electrolyte battery according to the 3rd embodiment described above (i.e. a single battery) as a secondary battery. When the plurality of single batteries is included in the battery pack, the respective single batteries are disposed so as to be electrically connected in series, in parallel, or in series and parallel.

The battery pack according to the 4th embodiment can further include a protective circuit. The protective circuit is used to control charge and discharge of the nonaqueous electrolyte battery. Alternatively, a circuit included in devices using a battery pack as a power source (e.g., electronic devices, automobiles, etc.) can also be used as a protective circuit of a battery pack.

Further, the battery pack according to the 4th embodiment may be provided with an external terminal for energization. An external terminal for energization is provided for the purpose of outputting a current from the nonaqueous electrolyte battery to the outside, and inputting a current to the nonaqueous electrolyte battery. In other words, when a battery pack is used as a power source, a current is supplied to the outside through an external terminal for energization. Further, when charging the battery pack, a charging current (including regenerative energy of power of a motor vehicle) is supplied to the battery pack through an external terminal for energization.

Figure 6:
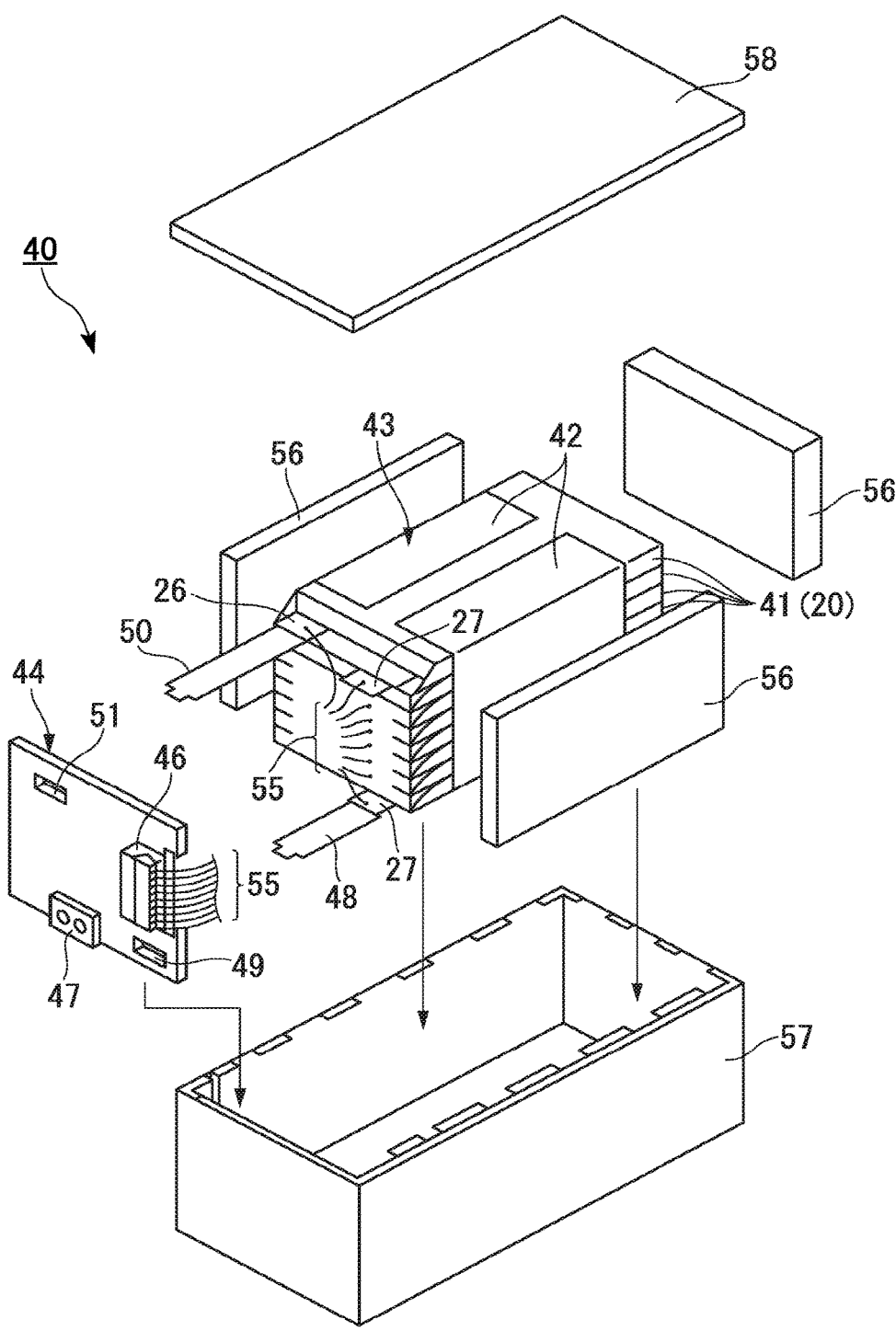
FIG. 6 is a schematic perspective view showing the battery pack according to the 4th embodiment.
Figure 7:
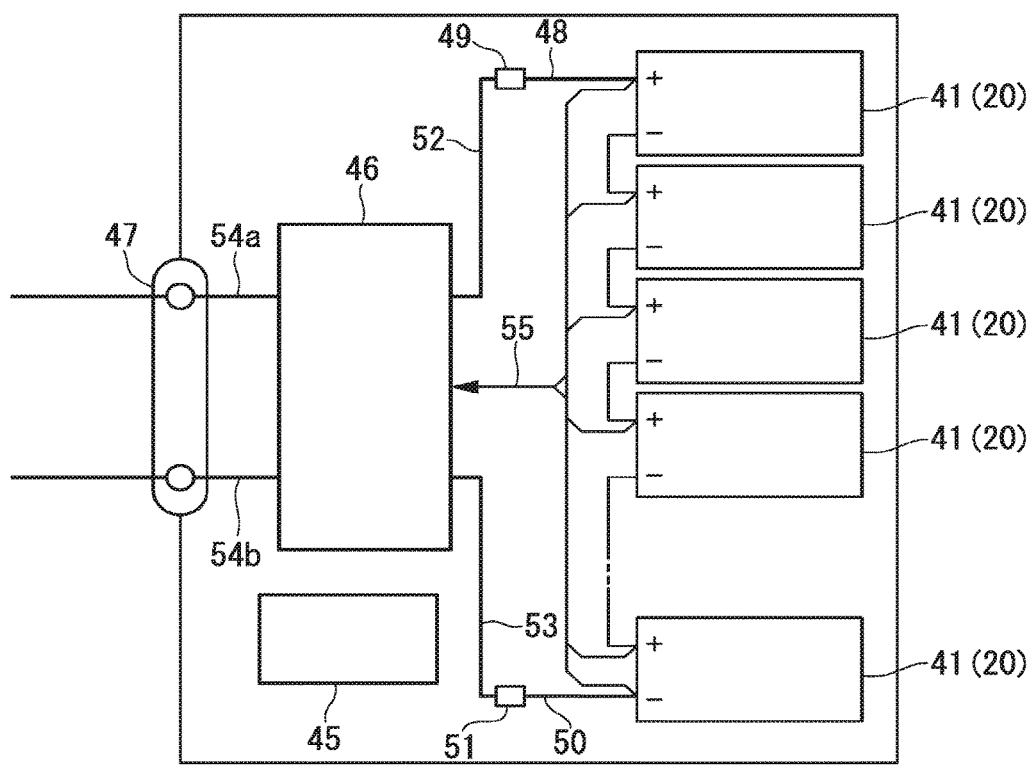
FIG. 7 is a schematic view showing the battery pack according to the 4th embodiment.

Referring to FIG. 6 and FIG. 7, the battery pack 40 according to the present embodiment is described in detail. In the battery pack 40 shown in FIG. 7, the flat type nonaqueous electrolyte battery 20 shown in FIG. 2 is used as the single battery 41.

The plurality of single batteries 41 is laminated so that the negative electrode terminals 26 and the positive electrode terminals 27 extending to the outside are arranged in the same direction, and thus the assembled batteries 43 are configured by fastening with the adhesive tape 42. These single batteries 41 are connected mutually and electrically in series, as shown in FIG. 6 and FIG. 7.

The printed wiring board 44 is disposed to face the side surfaces of the single batteries 41 in which the negative electrode terminals 26 and the positive electrode terminals 27 extend. As shown in FIG. 6, the thermistor 45 (see FIG. 7), the protective circuit 46 and the energization terminal 47 for an external device are mounted on the printed wiring board 44. Herein, an insulation plate (not shown in the figure) is mounted on the surface of the printed wiring hoard 44 facing the assembled batteries 43 in order to avoid unnecessary connection with wirings of the assembled batteries 43.

The positive electrode-side lead 48 is connected to the positive electrode terminal 27 located in the lowermost layer of the assembled batteries 43, and the front end of the positive electrode-side lead is inserted into the positive electrode-side connector 49 of the printed wiring board 44 to be electrically connected. The negative electrode-side lead 50 is connected to the negative electrode terminal 26 located in the uppermost layer of the assembled batteries 43, and the front end of the negative electrode-side lead is inserted into the negative electrode-side connector 51 of the printed wiring board 44 to be electrically connected. These positive electrode-side connector 49 and negative electrode-side connector 51 are connected to the protective circuit 46 via wirings 52 and 53 (see FIG. 7) formed in the printed wiring board 44.

The thermistor 45 is used to detect a temperature of the single battery 41. Although not shown in FIG. 6, the thermistor is installed near the single batteries 41, and a detection signal is transmitted to the protective circuit 46. The protective circuit 46 controls charge and discharge of the single battery 41 so as to protect the battery pack. It is possible to block the plus-side wiring 54a and the minus-side wiring 54b between the protective circuit 46 and the energization terminal 47 for an external device under a predetermined condition. Here, for example, the predetermined condition means that the detection temperature of the thermistor 45 becomes equal to or greater than a predetermined temperature. In addition, the predetermined condition also means that an overcharge, overdischarge, overcurrent, or the like of the single battery 41 be detected. The detection of the overcharge or the like is performed for the respective single batteries 41 or all of the single batteries 41. Herein, when the overcharge or the like is detected in the respective single batteries 41, a battery voltage may be detected, or a positive electrode potential or a negative electrode potential may be detected. In the latter case, a lithium electrode used as a reference electrode is inserted into the respective single batteries 41. In the case of FIG. 6 and FIG. 7, wirings 55 for voltage detection are connected to the respective single batteries 41 and detection signals are transmitted to the protective circuit 46 via the wirings 55.

As shown in FIG. 6, the protective sheets 56 formed of rubber or resin are disposed on three side surfaces of the assembled batteries 43 excluding the side surface from which the positive electrode terminals 27 and the negative electrode terminals 26 protrude.

The assembled batteries 43 are stored together with the respective protective sheets 56 and the printed wiring board 44 in the storing container 57. That is, the protective sheets 56 are disposed on both of the inner surfaces of the storing container 57 in the longer side direction and the inner surface in the shorter side direction, and the printed wiring board 44 is disposed on the inner surface opposite to the protective sheet 56 in the shorter side direction. The assembled batteries 43 are located in a space surrounded by the protective sheets 56 and the printed wiring board 44. The cover 58 is mounted on the upper surface of the storing container 57.

When the assembled batteries 43 are fixed, a thermal shrinkage tape may be used instead of the adhesive tape 42. In this case, protective sheets are disposed on both side surfaces of the assembled batteries, the thermal shrinkage tape is circled, and then the thermal shrinkage tape is subjected to thermal shrinkage, so that the assembled batteries are fastened.

Here, the single batteries 41 connected in series are shown in FIG. 6 and FIG. 7. However, to increase a battery capacity, the single batteries 41 may be connected in parallel or may be connected in a combination form of series connection and parallel connection. The assembled battery packs can also be connected in series or in parallel.

According to the aforementioned present embodiment, it is possible to provide the battery pack. The battery pack according to the present embodiment includes at least one of the aforementioned nonaqueous electrolyte battery according to the 3rd embodiment.

This kind of battery pack is excellent in energy density and long life

Herein, the form of the battery pack can be appropriately modified according to a use application. The use application of the battery pack according to the embodiment is preferably one which is required to show excellent cycle characteristics when a large current is extracted. Specific examples of the use application include a power of digital cameras; and an installation for a vehicle such as a two-wheeled or four-wheeled hybrid electric vehicle, a two-wheeled or four-wheeled electric vehicle, and an assist bicycle. In particular, the battery pack using the nonaqueous electrolyte batteries with excellent high temperature characteristics is appropriately used for an installation for a vehicle. In a vehicle equipped with the battery pack, for example, the battery pack recovers regenerative energy of power of a motor vehicle.

EXAMPLES

Hereinafter, the aforementioned embodiments are described in more details on the basis of the examples.

Example 1

Under the following conditions, the pulverization and kneading of SiO, the formation of the complex, and the firing the complex in an Argon (Ar) gas were carried out, to thereby obtain the negative electrode active material.

The pulverization of SiO was carried out in the following manner. The raw material SiO powder was subjected to the pulverization process in a continuous type bead mill device, which used beads having a bead diameter of 0.5 μm and ethanol as a dispersion medium, for a predetermined time, to thereby obtain the SiO powder. Further, the SiO powder was pulverized in a planetary ball mill, which used the ball having a diameter of 0.1 μm and ethanol as a dispersion medium, to thereby obtain the SiO fine powder.

The SiO fine powder 0.7 g obtained by the fine pulverization process was added to the Kapton® type polyimide/N-methyl-2-pyrrolidone (NMP) varnish 10 g which acted as a carbon precursor (the concentration of the Kapton® type polyimide: 14 mass %). Then, the liquid was subjected to the ball mill mixing process using the $ZrO_2$ ball.

The $ZrO_2$ balls were removed from the obtained mixed liquid, and the mixed liquid was heated to 130° C. and dried. Thereafter, the dried mixture was subjected to the imidization process for 3 hours at 300° C., to thereby obtain the mixture of the silicon dioxide particles, the silicon particles, and the carbon precursor.

The obtained mixture was added in the alumina crucible and subjected to the thermal treatment using the electric furnace. The thermal treatment was carried out at 1000° C. for 3 hours under an inert atmosphere obtained by introducing an argon gas after vacuum exchange.

Next, the obtained fired product was pulverized in the agate mortar, and subjected to the sieve having an opening of 20 μm, to thereby obtain the negative electrode material comprised of the composite particle in which the silicon dioxide particle and the silicon particle were coated with the carbonaceous material.

The obtained negative electrode material 0.6 g and the graphite powder 0.1 g having an average particle size of 3 μm were added in N-methyl-2-pyrrolidone (NMP) in which polyimide was dissolved at 16 mass %, and the solution was mixed using a mixer, to thereby prepare the pasty slurry.

This slurry was applied onto the copper foil having a thickness of 12 μm, and was rolled and subjected to the thermal treatment at 400° C. for 2 hours in an argon gas atmosphere, to thereby obtain the copper foil with the negative electrode material.

(Structural Analysis)

As the structural analysis for the negative electrode material, X-ray diffraction and Raman spectroscopic analysis were carried out.

In the X-ray diffraction, the X-ray diffractometer called SmartLab manufactured by Rigaku Corporation was used, and CuKα was used as an X-ray source.

The crystallite size Lc in the c-axis direction observed around 20° to 26° and the crystallite size La in the a-axis direction observed around 40° to 44° were calculated by using Scherrer's equation and the peak half-widths obtained from the diffraction lines around 2θ=20° to 26° and 40° to 44°.

In the Raman spectroscopic analysis, the microscopic laser Raman device called SENTERRA manufactured by Bruker Optics, K.K. was used. The sample powder distributed on the flat plate was measured by using the light having an excitation wavelength of 532 nm, and the calculations were carried out to obtain the half-width of the d-band and the peak intensity ratio Id/Ig of the peak intensity Id of the d-band to the peak intensity Id of the d-band to the peak intensity Ig of the g-band.

The results are shown in Table 1.

[Evaluation of Electrochemical Characteristics]

(Preparation of Non Aqueous Electrolyte Solution)

Ethylene carbonate (EC) and diethyl carbonate (DEC) were respectively mixed at a volume ratio of 1:2, to thereby prepare the mixed solvent. In this mixed solvent, $LiPF_6$ was dissolved, to thereby prepare the nonaqueous electrolyte solution.

(Production of Nonaqueous Electrolyte Battery)

The copper foil with the negative electrode material was cut in the size of 20 mm×20 mm, and then, was dried under vacuum at 100° C. for 12 hours, to thereby obtain the test electrode.

The aforementioned test electrode, the Li metal as a counter electrode and a reference electrode, and the non-aqueous electrolytic solution were housed in the bottomed container, to produce the nonaqueous electrolyte battery half cell.

The assembly of the battery was carried out in the glove box filled with an argon atmosphere.

(Charge and Discharge Test)

Regarding the conditions for the charge and discharge test, the charge was carried out at a constant current density of 0.5 mA/cm² until the electrical potential difference between the reference electrode and the test electrode became 0.01 V, and moreover, the constant voltage charge was carried out at 0.01 V. The termination condition was set as 0.025 mA/cm² or 150 hours. The discharge was carried out at a constant current density of 0.25 mA/cm² to reach 1.5 V. The ratio of the discharge capacity to the charge capacity at this time was defined as the initial charge and discharge efficiency.

Thereafter, the charge was carried out at a current density of 1.5 mA/cm² (cut off 0.0075 mA/cm²) until the electrical potential difference between the reference electrode and the test electrode became 0.01 V, and then the discharge was carried out at the current density of 1.5 mA/cm² to reach 1.5 V. This cycle was repeated 100 times. The ratio of the discharge capacity at the 50th cycle to the discharge capacity at the 1st cycle of the charge and discharge at a current density of 1.5 mA/cm$^2$ was defined as the discharge capacity holding ratio.

The result is showed in Table 2.

Example 2

The SiO fine powder 0.7 g obtained by the same fine pulverization process as in Example 1 and the 4,4'-diphenylmethane bismaleimide resin 1.162 g, which acted as a carbon precursor, were subjected to the kneading process using a kneader at 150° C.

The obtained kneaded product was heated for 3 hours at 180° C. and subjected to the curing treatment for the 4,4'-diphenylmethane bismaleimide resin.

The obtained mixture was added in an alumina crucible and subjected to thermal treatment using the electric furnace. The thermal treatment was carried out at 1000° C. for 3 hours under an inert atmosphere obtained by introducing an argon gas after vacuum exchange.

Next, the obtained fired product was pulverized in the agate mortar, and subjected to the sieve having an opening of 20 µm, to thereby obtain the negative electrode material made of the composite particle in which the silicon dioxide particle and the silicon particle were coated with the carbonaceous material.

In the same manner as in Example 1, the obtained negative electrode material was subjected to X-ray diffraction and Raman spectroscopic analysis. The results are shown in Table 1.

In the same manner as in Example 1 except for using the negative electrode material, the nonaqueous electrolyte battery was produced, and was subjected to the charge and discharge test. The results are shown in Table 2.

Example 3

The negative electrode material comprised of the composite particle was produced in the same manner as in Example 1 except for using the silicon particle having an average particle size of 20 nm as the raw material powder.

In the same manner as in Example 1, the obtained negative electrode material was subjected to X-ray diffraction and Raman spectroscopic analysis. The results are shown in Table 1.

In the same manner as in Example 1 except for using the negative electrode material, the nonaqueous electrolyte battery was produced, and was subjected to the charge and discharge test. The results are shown in Table 2.

Example 4

The negative electrode material comprised of the composite particle was produced in the same manner as in Example 1 except for using, as the raw material powder, the particles obtained by mixing the silicon particle having an average particle size of 30 nm and the silicon dioxide particle having an average particle size of 7 nm at the mass ratio of the Si/SiO$_2$=10/90.

In the same manner as in Example 1, the obtained negative electrode material was subjected to X-ray diffraction and Raman spectroscopic analysis. The results are shown in Table 1.

In the same manner as in Example 1 except for using the negative electrode material, the nonaqueous electrolyte battery was produced, and was subjected to the charge and discharge test. The results are shown in Table 2.

Example 5

The particles 0.7 g, which were obtained by mixing the silicon particle having an average particle size of 30 nm and the silicon dioxide particle having an average particle size of 7 nm at the mass ratio of the Si/SiO$_2$=10/90, were added to the solution, which was obtained by dissolving the naphthol novolac based phenol resin 1.162 g (the carbon precursor resin) in ethanol 10 g. Then, the liquid was subjected to the ball mill mixing process using the ZrO$_2$ ball.

The ZrO$_2$ balls were removed from the obtained mixed liquid, and the mixed liquid was heated to 80° C. and dried. Thereafter, the dried mixture was subjected to the imidization process for 1 hour at 150° C., to thereby obtain the mixture of the silicon dioxide particles, the silicon particles, and the carbon precursor.

The obtained mixture was added in the alumina crucible and subjected to the thermal treatment using the electric furnace. The thermal treatment was carried out at 1000° C. for 3 hours under an inert atmosphere obtained by introducing an argon gas after vacuum exchange.

Next, the obtained fired product was pulverized in the agate mortar, and subjected to the sieve having an opening of 20 µm, to thereby obtain the negative electrode material comprised of the composite particle in which the silicon dioxide particle and the silicon particle were coated with the carbonaceous material.

In the same manner as in Example 1, the obtained negative electrode material was subjected to X-ray diffraction and Raman spectroscopic analysis. The results are shown in Table 1.

In the same manner as in Example 1 except for using the negative electrode material, the nonaqueous electrolyte battery was produced, and was subjected to the charge and discharge test. The results are shown in Table 2.

Example 6

The negative electrode material comprised of the composite particle was produced in the same manner as in Example 1 except for using the tin (Sn) fine particle having an average particle size of about 80 nm as the raw material powder.

In the same manner as in Example 1, the obtained negative electrode material was subjected to X-ray diffraction and Raman spectroscopic analysis. The results are shown in Table 1.

In the same manner as in Example 1 except for using the negative electrode material, the nonaqueous electrolyte battery was produced, and was subjected to the charge and discharge test. The results are shown in Table 2.

Comparative Example 1

The SiO fine powder 2.8 g obtained by the same fine pulverization process as in Example 1 was added to the mixed solution of furfuryl alcohol 4.0 g, ethanol 10 g and water 0.125 g, and the liquid was subjected to the kneading process using a kneader, to thereby prepare slurry-like liquid.

To the slurry obtained by the kneading process, dilute hydrochloric acid 0.2 g which became the polymerization catalyst for furfuryl alcohol was added, and was allowed to stand at room temperature so as to be dried and cured.

The obtained mixture was added in the alumina crucible and subjected to the thermal treatment using the electric furnace. The thermal treatment was carried out at 1000° C. for 3 hours under an inert atmosphere obtained by introducing an argon gas after vacuum exchange.

Next, the obtained fired product was pulverized in the agate mortar, and subjected to the sieve having an opening of 20 μm, to thereby obtain the negative electrode material comprised of the composite particle in which the silicon dioxide particle was coated with the carbonaceous material.

In the same manner as in Example 1, the obtained negative electrode material was subjected to X-ray diffraction and Raman spectroscopic analysis. The results are shown in Table 1.

In the same manner as in Example 1 except for using the negative electrode material, the nonaqueous electrolyte battery was produced, and was subjected to the charge and discharge test. The results are shown in Table 2.

Comparative Example 2

The negative electrode material comprised of the composite particle was produced in the same manner as in Comparative Example 1 except for using the silicon particle 2.8 g having an average particle size of 20 nm as the raw material powder.

In the same manner as in Example 1, the obtained negative electrode material was subjected to X-ray diffraction and Raman spectroscopic analysis. The results are shown in Table 1.

In the same manner as in Example 1 except for using the negative electrode material, the nonaqueous electrolyte battery was produced, and was subjected to the charge and discharge test. The results are shown in Table 2.

Comparative Example 3

The negative electrode material comprised of the composite particle was produced in the same manner as in Comparative Example 1 except for using, as the raw material powder, the particles 2.8 g obtained by mixing the silicon particle having an average particle size of 30 nm and the silicon dioxide particle having an average particle size of 7 nm at the mass ratio of the $Si/SiO_2$=10/90.

In the same manner as in Example 1, the obtained negative electrode material was subjected to X-ray diffraction and Raman spectroscopic analysis. The results are shown in Table 1.

In the same manner as in Example 1 except for using the negative electrode material, the nonaqueous electrolyte battery was produced, and was subjected to the charge and discharge test. The results are shown in Table 2.

Comparative Example 4

The negative electrode material comprised of the composite particle was produced in the same manner as in Example 1 except that the SiO fine powder 2.8 g obtained by the same fine pulverization process as in Example 1 was added to the polyimide/N-methyl-2-pyrrolidone (NMP) varnish 18 g containing, as the components, pyromellitic anhydride and hexamethylenediamine which acted as carbon precursors (the concentration of the polyimide: 14 mass %), and then the kneading process was carried out by using a kneader.

In the same manner as in Example 1, the obtained negative electrode material was subjected to X-ray diffraction and Raman spectroscopic analysis. The results are shown in Table 1.

In the same manner as in Example 1 except for using the negative electrode material, the nonaqueous electrolyte battery was produced, and was subjected to the charge and discharge test. The results are shown in Table 2.

Comparative Example 5

The negative electrode material comprised of the composite particle was produced in the same manner as in Comparative Example 1 except for using the tin (Sn) fine particle having an average particle size of about 80 nm as the raw material powder.

In the same manner as in Example 1, the obtained negative electrode material was subjected to X-ray diffraction and Raman spectroscopic analysis. The results are shown in Table 1.

In the same manner as in Example 1 except for using the negative electrode material, the nonaqueous electrolyte battery was produced, and was subjected to the charge and discharge test. The results are shown in Table 2.

TABLE 1

| | Lc/La | Peak Half-Width of D-Band [cm$^{-1}$] | Id/Ig |
|---|---|---|---|
| Example 1 | 0.51 | 220 | 1.09 |
| Example 2 | 0.59 | 203 | 1.2 |
| Example 3 | 0.51 | 220 | 1.09 |
| Example 4 | 0.52 | 220 | 1.09 |
| Example 5 | 0.68 | 182 | 1.35 |
| Example 6 | 0.52 | 222 | 1.09 |
| Comparative Example 1 | 1.11 | 128 | 1.38 |
| Comparative Example 2 | 1.11 | 128 | 1.38 |
| Comparative Example 3 | 1.15 | 128 | 1.38 |
| Comparative Example 4 | 0.95 | 139 | 1.44 |
| Comparative Example 5 | 1.12 | 126 | 1.37 |

TABLE 2

| | Discharge Capacity [mAh/g] | Initial Efficiency [%] | Capacity Holding Ratio after 50th Cycle |
|---|---|---|---|
| Example 1 | 904 | 69 | 93 |
| Example 2 | 892 | 72 | 94 |
| Example 3 | 2400 | 85 | 82 |
| Example 4 | 771 | 61 | 95 |
| Example 5 | 784 | 56 | 94 |
| Example 6 | 451 | 70 | 96 |
| Comparative Example 1 | 838 | 60 | 78 |
| Comparative Example 2 | 2362 | 78 | 55 |
| Comparative Example 3 | 705 | 51 | 77 |
| Comparative Example 4 | 825 | 58 | 93 |
| Comparative Example 5 | 466 | 59 | 93 |

From the results shown in Table 1 and Table 2, it was found that, in the negative electrode material of Examples 1-6, the peak half value widths of the d-band measured from the Raman spectrum of the carbonaceous material were 150 cm$^{-1}$ or more, and the ratios Lc/La of the crystallite size Lc in the c-axis direction observed around 20° to 26° and the crystallite size La in the a-axis direction observed around 40° to 44° were 0.7 or less. In the evaluations of the electrochemical characteristics carried out by using these negative electrode materials, it was found that the initial efficiencies and the cycle characteristics were improved as compared with the negative electrode materials of Comparative Examples 1-5 composed of the same silicon-based composition. Also, the initial efficiency of the negative electrode material of Example 5 was sufficiently improved as compared with Comparative Example 3 even though being lower than that of Example 4.

While certain embodiments have been described, these embodiments have been presented by way of example only, and are note intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An electrode material for a nonaqueous electrolyte battery, comprising: a composite particle containing a carbonaceous material, wherein
   a peak half-width of d-band measured from a Raman spectrum of the carbonaceous material is at 150 cm-1 or more, and
   a ratio Lc/La of a crystallite size Lc in a c-axis direction observed at 20° to 26° in a X-ray diffraction to a crystallite size La in an a-axis direction observed at 40° to 44° is 0.7 or less,
   wherein the composite particle is a complex of the carbonaceous material, a metal and a metal oxide, and
   wherein the metal and the metal oxide are particles of a silicon and a silicon oxide which are represented by the general formula $SiO_x$ ($0 \leq x \leq 2.0$).

2. The electrode material according to claim 1, wherein a peak intensity ratio Id/Ig of a peak intensity Id of d-band measured from a Raman spectrum of the carbonaceous material to a peak intensity Ig of g-band is 1.3 or less.

3. The electrode material according to claim 1, wherein
   the metal is at least one element selected from the group consisting of Si, Sn, Al, In, Ga, Pb, Ti, Ni, Mg, W, Mo and Fe; alloys containing said element; and
   the metal oxide is at least one oxide selected from the group consisting of oxides having the element and oxides containing an alloy having the element.

4. An electrode for a nonaqueous electrolyte battery comprising: a current collector; and an electrode mixture layer that is formed on the current collector and contains the electrode material according to claim 1, an electroconductive material and a binder.

5. A nonaqueous electrolyte battery comprising: a positive electrode containing a positive electrode active material; the negative electrode; and a nonaqueous electrolyte, wherein the negative electrode is the electrode according to claim 4.

6. A battery pack comprising the nonaqueous electrolyte battery according to claim 5.

7. The battery pack according to claim 6 further comprising an external terminal for energization and a protective circuit.

8. The battery pack according to claim 6, wherein the nonaqueous electrolyte batteries are connected in series, in parallel or with a combination of series connection and parallel connection.

* * * * *